Jan. 3, 1950

W. W. HANSEN 2,493,137

VOLTAGE DOUBLING CIRCUITS

Filed April 26, 1949

WITNESSES

INVENTOR.
William W. Hansen
BY

Patented Jan. 3, 1950

2,493,137

UNITED STATES PATENT OFFICE 2,493,137

VOLTAGE DOUBLING CIRCUITS

William W. Hansen, Palo Alto, Calif., assignor to the United States of America as represented by the United States Atomic Energy Commission Application April 26, 1949, Serial No. 89,764

4 Claims. (Cl. 315—227)

This invention relates to voltage doubling circuits and, more particularly, to such circuits for use with X-ray photography equipment.

A number of systems are available in the prior art for translating the potential of a primary source of energy to a potential having a magnitude suitable for a selected application. A common arrangement for the purpose utilizes capacitors so arranged that they are charged in parallel and re-connected in series for use. An arrangement of this sort is suitable for many purposes, but is deficient for certain applications, such as, for example, photo-flash and X-ray photography. For instance, an elaborate switching arrangement is necessary to disconnect the capacitors from the parellel state and re-connect them in the series state. Such an organization suffers from complexity and presents insulation problems. In addition, the exposure time of the photo-flash or X-ray tube is determined by the discharge time of the capacitors and the resistance and inductance of the associated circuits. It follows that a change in characteristic of the photo-flash or X-ray tube results in a corresponding change in exposure period. Even very small changes in exposure duration from the selected duration is deleterious to satisfactory results in very high speed photography.

The device of the present invention eliminates the deficiencies above mentioned. The present disclosure is directed to a potential source for the energization of photo-tubes or X-ray tubes and the like which comprises a pair of capacitors and a discharge device serially connected together. The capacitors are charged in parallel by connection through resistors with a primary source of potential. An inductance is serially connected with a switch and one of said capacitors. Assuming a charged condition for the said capacitors, the switch connecting the inductance and the capacitor is closed thereby permitting the potential of the capacitor to shock excite the resulting resonant circuit and causes an oscillation at the natural period of the resonant circuit. The polarity of the capacitor will therefore be reversed a half period of the resonant circuit after the switch is closed thereby impressing the sum of potentials of the two capacitors across the discharge tube. It is advantageous to trigger on the discharge tube at very nearly the precise instant that the said capacitor reaches its full reversed potential.

The organization of the present invention is capable of energizing any type of load for short intervals, but it has a particular advantage in its application to extremely short exposure time photography in that the period of activation of the source of film excitation can be closely controlled by the selected characteristics of the inductance-capacitor combination.

The source of film excitation may be a photo-flash tube of the gaseous type, an X-ray tube or any other device capable of rapid rise and decay of a radiant field to which the photographic film is sensitive.

Further features and advantages of this invention will appear from the following description of species thereof and from the drawing in which.

Figure 1:
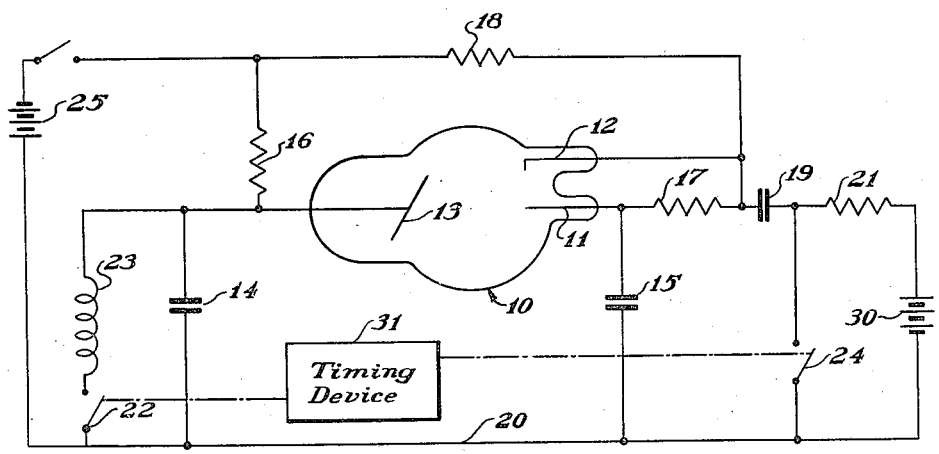
Figure 1 is a diagrammatic presentation of a preferred embodiment thereof.

Referring to the drawing, a space discharge device 10 is shown having a cathode 11, an anode 13 and an initiator electrode 12. Although the space discharge device is shown as an X-ray tube, it is apparent that other types of space discharge devices may be used. The energy of excitation for the space discharge tube is stored in capacitors 14 and 15.

Capacitor 14 is connected between anode 13 and the common return conductor 20; capacitor 15 is connected between cathode 11 and conductor 20. Therefore, the capacitors are serially connected with respect to the space discharge device. To the end that capacitors 14 and 15 are charged to the voltage of the primary potential source, the terminal of capacitor 14, which is connected to anode 13, is also connected through resistor 16 to the negative pole of the primary potential source. Capacitor 15 is charged to the voltage of the primary potential source by the series connection therewith through resistors 17 and 18. The terminals of the capacitors connected to the common conductor 20 are connected to the positive pole of primary potential source 25. It follows from the description thus far that capacitors 14 and 15 are charged to equal potentials in opposition across the space discharge device.

To the end that the potential of capacitor 14 will be reversed so that it will be serially additive to the potential of capacitor 15, an inductance 23 and switch 22 are connected serially therewith. Upon the instant of closure of switch 22, the energy stored in capacitor 14 causes an oscillation in the resonant circuit comprising capacitor 14 and inductance 23 with the result that the potential across the capacitor cyclically reverses at the resonant circuit period. The conditions in the resonant circuit are demonstrated by the curve of Figure 2. The potential at the point 27 is the steady state charged potential of capacitor 14. The locus on the curve, indicated by numeral 29, represents the instant of closure of switch 22. The potential at the anode terminal of capacitor 14 at half the period of the resonant circuit later is indicated by reference numeral 28.

Figure 2:
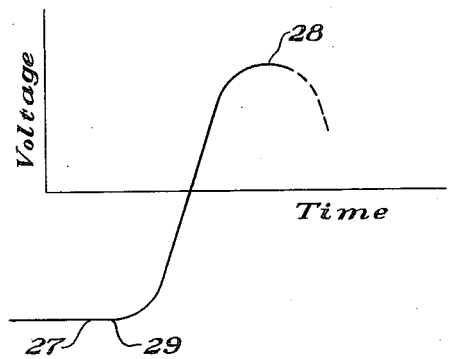
Figure 2 is a curve showing the reversability of the potential in capacitor 14 of Figure 1.

In order that utilization may be made of the temporarily reversed potential in capacitor 14, timing means, shown at 31 in block form, are provided for discharging both capacitors 14 and 15 through the space discharge device at the instant in the vicinity of that indicated by numeral 28 in Figure 2.

Space discharge tubes having initiator electrodes are particularly suited for energization by the voltage doubling circuit of the present invention for the reason that the instant of discharge can be closely determined. In the embodiment shown, a capacitor 19 is provided, one terminal of which is connected through a resistance 21 to the positive pole of initiator potential source 30. The second terminal of the capacitor is connected directly to the initiator electrode 12 and through resistor 17 to anode 11. An initiator switch 24 is connected between the common junction of capacitor 19 and resistor 21 and the common return conductor 20. Operation of the initiator circuit is as follows:

Capacitor 19 is charged to that condition in which the terminal connected through resistor 21 to the positive pole of initiator source 30 has a positive potential equal to source 30. If the switch 24 is closed, the positive potential on capacitor 19 is depressed to that of the common junction of main capacitors 14 and 15 with the result that the other terminal of the capacitor has a negative value which is directly impressed on initiator electrode 12. The potential on cathode 11 is not changed to any appreciable degree because of the stabilizing effect of resistor 17 and capacitor 15. The negative potential on initiator electrode 12 results in a discharge between itself and cathode 11 thereby creating a space charge of electrons at cathode 11. The space discharge device 10 is thereby readied for discharge by the last mentioned operation providing sufficient potential exists between anode 13 and cathode 11. It follows therefore that switch 24 must be closed a half period of the resonant circuit 14—23 after the closure of switch 22. The manner in which this is done is not a part of the present invention and timing mechanisms old in the art may be utilized and are indicated diagrammatically in block 31.

The switches 22 and 24 are shown as mechanical switches for purposes of illustration and explanation. Thee switches may take other suitable forms among which are, for example, thyratrons, ignitrons, and series spark gaps.

The invention has been described with respect to an X-ray tube. It is understood that the invention is directed primarily to a voltage doubling device. The invention is suitable for the energization of other types of loads with simplification of application in some cases. For instance, in the application to energization of simple two-electrode gas discharge tubes, the initiator capacitor 19 and associated circuit components is omitted. The series potential of main capacitors 14 and 15 are selected of a value capable of initiating discharge in the vicinity of 180° reversal of potential across capacitor 14. This type of simplified application is also applicable to photo-flash discharge tubes having potential type initiator electrodes in which the intiator electrode is essentially a zero current device and operates to establish a breakthrough potential gradient. In this application, the inductance 23 may be tapped to provide an intermediate initiator electrode voltage.

It follows from the foregoing, therefore, that although the invention has been described with reference to certain specific embodiments, other modifications are possible. Therefore, the invention is to be restricted only by the appended claims as interpreted in view of the prior art.

What is claimed is:

1. In combination, a direct current source and a normally open load having first and second terminals, a first capacitor connected between the first terminal of said load and the positive terminal of said source, a second capacitor connected between the second terminal of the load and the positive terminal of said source, a first and second resistance connected respectively between the first load terminal and the negative terminal of said source, and the second load terminal and the negative terminal of said source, whereby under the normal open circuit condition of said load the capacitors are charged to the potential of said source, an inductance having one end connected to one terminal of one of said capacitors, means for connecting the second end of the inductance to the second terminal of said one of said capacitors, whereby the energy stored in the capacitor shock excites the said one of said capacitors and the inductance at the natural period thereof, and means for closing the load circuit a half period substantially after the second end of the inductance is connected to the second terminal of said one of said capacitors whereby the potentials of the first and second capacitors additively discharges the stored energy through said load.

2. In combination, a direct current source and an electron discharge device comprising at least an anode and a cathode, a first capacitor connected between the anode and the positive terminal of said source, a second capacitor connected between the cathode and the positive terminal of said source, at least one resistor serially connected between the cathode and the negative terminal of said source and at least one resistor serially connected between the anode and the negative terminal of said source, an inductance and a switch serially connected with the first capacitor whereby closure of said switch permits the potential stored in the first capacitor to shock excite the capacitor-inductance combination at its natural period whereby at an instant a half of said period after the closure of said switch, a potential equal to twice the source potential is impressed across the cathode and anode space of the space discharge device.

3. A voltage doubler circuit comprising a source of unidirectional potential, a normally open load circuit having first and second terminals, a first and a second capacitor each having first and second terminals, means connecting the first terminals of the first and second capacitors respectively to the load first and second terminals, means connecting the second terminals of the first and second capacitors together and to the first terminal of said source, resistance means connecting each of the first terminals of the first and second capacitors to the second terminal of said source; an inductance, means for inserting said inductance in parallel with the first of said capacitors to establish thereby a resonant circuit, and means for closing the load circuit a half period of the resonant circuit after the establishment of the same, whereby the potential across the resonant circuit is additive with the potential of the second capacitor to cause a discharge through the load.

4. In combination, a direct current source and an electron discharge device comprising a cathode, an anode and an initiating electrode, a first capacitor connected between the anode and the positive terminal of said source, a second capacitor connected between the cathode and the positive terminal of said source, a resistance serially connected between the cathode and the negative terminal of said source and a resistance serially connected between the anode and the negative terminal of said source, an inductance and a normally open first switch serially connected with the first capacitor whereby closure of said switch establishes a resonant circuit; a source of initiating potential, a third capacitor, and a resistance connected between the positive terminal of the initiator potential source and one terminal of the capacitor, a connection between the third capacitor free terminal and the initiator electrode, a connection between the negative terminal of the initiator potential source and the first and second capacitor connections to the positive terminal of the direct current source, a normally open switch connected between the negative terminal of the initiator potential source and the junction of the third resistance and third capacitor, whereby under the condition of energy stored in said capacitors, the first switch is closed thereby permitting the energy of the first capacitor to create an oscillatory condition in the resonant circuit, and whereby closure of the second switch a half period substantially of said resonant circuit after closure of the first switch causes the third capacitor to energize the initiator electrode thereby permitting the energy of the first and second capacitors to discharge additively through the electron discharge device.

WILLIAM W. HANSEN.

REFERENCES CITED

The following references are of record in the file of this patent:

UNITED STATES PATENTS

| Number | Name | Date |
|---|---|---|
| 2,028,839 | Klinkhamer | Jan. 28, 1936 |
| 2,285,322 | Anderson | June 2, 1942 |